US006693377B1

(12) United States Patent
Mueller et al.

(10) Patent No.: US 6,693,377 B1
(45) Date of Patent: Feb. 17, 2004

(54) DIELECTRIC LAYER FOR DISCHARGE LAMPS AND CORRESPONDING PRODUCTION METHOD

(75) Inventors: Ulrich Mueller, Munich (DE); Franz Zwaschka, Ismaning (DE); Frank Vollkommer, Buchendorf (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/719,387

(22) PCT Filed: Jun. 11, 1999

(86) PCT No.: PCT/DE99/01703

§ 371 (c)(1), (2), (4) Date: Dec. 12, 2000

(87) PCT Pub. No.: WO99/66538

PCT Pub. Date: Dec. 23, 1999

(30) Foreign Application Priority Data

Jun. 16, 1998 (DE) ........................................ 198 26 809

(51) Int. Cl.[7] .......................... H01J 17/04; C03B 32/02
(52) U.S. Cl. ........................................ 313/623; 65/33.4
(58) Field of Search ................................ 313/220, 221, 313/238, 112, 623, 622, 624, 625, 607, 231, 573, 234; 252/512, 514; 65/33.4, 33.6, 44

(56) References Cited

U.S. PATENT DOCUMENTS

| | | | | |
|---|---|---|---|---|
| 3,848,152 A | * 11/1974 | Schultz | ....................... | 313/112 |
| 4,122,042 A | * 10/1978 | Meden-Piesslinger et al. | .......................... | 252/512 |
| 4,633,137 A | * 12/1986 | Scott et al. | ................. | 313/634 |
| 5,196,759 A | * 3/1993 | Parham et al. | .............. | 313/112 |
| 5,463,274 A | 10/1995 | Winsor | | |
| 5,532,552 A | * 7/1996 | Heider et al. | ............... | 313/634 |
| 6,200,918 B1 | * 3/2001 | Yanagitani et al. | ......... | 313/635 |

FOREIGN PATENT DOCUMENTS

| | | | |
|---|---|---|---|
| EP | 0 324 953 | 12/1988 | |
| EP | 0 326 092 | 1/1989 | |
| EP | 0 363 832 | 10/1989 | |
| JP | 8-287871 | 11/1996 | ............ H01J/61/35 |
| WO | 94/23442 | 10/1994 | |
| WO | 97/04625 | 2/1997 | |

OTHER PUBLICATIONS

Patent Abstracts of Japan, vol. 108, No. 683 (E–1477), Dec. 15, 1993 & JP 05 234515 a (NEC CORP), Sep. 10, 1993, abstract.
Database WPI, Derwent Publications Ltd., London, GB; AN 1985–012922, XP002123085, Storbek, Vaupel: "Thick film moisture sensor—with dielectric layer comprising glass and crystalline filler" & DD 213 515 A (AKAD Wissenschaften DDR), Sep. 12, 1984, abstract.

* cited by examiner

*Primary Examiner*—James Clinger
*Assistant Examiner*—Chuc Tran
(74) *Attorney, Agent, or Firm*—Robert F. Clark

(57) ABSTRACT

The invention relates to a printing method for applying dielectric layers made of solder glass on strip-shaped metal electrodes of discharge lamps, which are operated by means of pulsed dielectrically inhibited discharge. An aggregate having a higher melting temperature than solder glass, e.g. crystalline or amorphous aluminum oxide or quartz glass powder, is used as printing paste in said method. The typical percentage by weight of the aggregate is between 2 and 30%. Better wetting of the strip-shaped metal electrode is thus obtained.

10 Claims, 2 Drawing Sheets

DIELECTRIC LAYER FOR DISCHARGE LAMPS AND CORRESPONDING PRODUCTION METHOD

TECHNICAL FIELD

The present invention relates to dielectric layers for discharge lamps which are operated by means of dielectric barrier discharge, to a process for producing layers of this type and to a discharge lamp having at least one of these dielectric layers.

In lamps of this type, either the electrodes of one polarity or all the electrodes, i.e. of both types of polarity, are separated from the discharge by means of a dielectric layer ("one-sided or two-sided dielectric barrier discharge"). Electrodes of this type are also referred to below as "dielectric electrodes" for short. A dielectric layer of this type is also referred to as a dielectric "barrier" or "barrier layer", and the discharge generated with an arrangement of this type is known as "barrier discharge" (dielectric barrier discharge, e.g. EP-A-0 324 953, page 4).

Dielectric electrodes are produced firstly by the electrodes being arranged outside the discharge vessel, e.g. on the outer wall, for example in the form of thin, metal strips which are parallel to one another and are of alternating polarity. Discharge lamps of this type are known, for example, from WO 94/23442 (FIGS. 5*a*, 5*b*) and WO 97/04625 (FIGS. 1*a*, 1*b*).

To protect against contact and/or external influences and to avoid sliding discharges between the electrodes of different polarity, the electrode strips may advantageously be covered with a thin dielectric layer, for example with a layer of glass.

Secondly, dielectric electrodes are produced by electrodes which are arranged inside the discharge vessel and are completely covered by a dielectric layer. In so-called flat reflectors, the dielectric electrodes are typically produced in the form of thin, metal strips which are arranged on the inner wall of the discharge vessel and, in addition, either individually—by means of thin, dielectric strips—or together—by means of a single, cohesive dielectric layer—are completely covered with respect to the interior of the discharge vessel. Discharge lamps of this type are known, for example, from EP 0 363 832 (FIG. 3) and German patent application P 197 11 892.5 (FIGS. 3*a*, 3*b*).

For the sake of simplicity, the terms "dielectric barrier layers or dielectric protective layers" are combined below under the term "dielectric layers".

In the present context and in the text which follows, the term "discharge lamp" is intended to mean radiation sources which emit light, i.e. visible electromagnetic radiation, and also ultraviolet (UV) and vacuum ultraviolet (VUV) radiation.

PRIOR ART

One possible option for covering thin, strip-like electrodes with the dielectric layers described in the introduction consists in fusing a suitably sized glass film, if appropriate with the aid of an intermediate layer of soldering glass, onto the electrode strips in question.

The drawbacks of this option are firstly the relatively high costs of suitable thin glass films, and also their high sensitivity to fracture. These drawbacks have hitherto stood in the way of automated, inexpensive production.

In principle, said layers can be applied more easily and at lower cost by means of the screen-printing technique. For this purpose, glass powder (glass frit)—the screen-printing paste—which is dispersed in a suitable organic solvent—the so-called screen-printing medium—is applied to the electrodes and to that surface of the discharge vessel which surrounds the electrodes with the aid of a so-called squeegee and a resilient screen. The screen is initially arranged at a certain distance from the surface. During the application, the squeegee passes over the screen, so that this screen, together with the printing paste, is pressed onto the surface. In the process, the squeegee fills the meshes in the screen with the printing paste, the squeegee simultaneously wiping the excess printing paste off the screen. After the squeegee has passed over the coated meshes, the corresponding meshes are lifted off the surface again, and the applied printing paste remains on the surface. After drying, the layer applied is fused, so that a hermetically sealed surface which is as far as possible planar and free of pores is formed. This is important since the thickness of the layer is a parameter which has a direct effect on the dielectric discharge, on the one hand, and the high-voltage contact protection, on the other hand.

However, a drawback is that the surface stress of the fused layer of soldering glass prevents complete wetting of the electrodes. Rather, it has been found that the fused soldering glass draws back from the metallic electrodes over a large area.

PRESENTATION OF THE INVENTION

The object of the present invention is to eliminate the above drawbacks and to provide a dielectric layer which completely covers at least a partial region of one or more electrodes and, in addition, covers at least the discharge-vessel wall which is immediately adjacent to this partial region of the electrode. A further aspect of the invention is that this layer be suitable as a dielectric barrier for a dielectric barrier discharge, in particular for a pulsed dielectric barrier discharge.

This object is achieved by the features of claim 1. Further advantageous features are given in the claims which are dependent on claim 1.

A further object is to specify a printing process for applying a dielectric layer, in which the printing paste, in the molten state, completely wets at least a partial region of metallic electrodes and also wets the discharge-vessel wall which is immediately adjacent to this partial region of the electrode, and consequently, after it has been fired, also completely covers the at least one partial region of the electrodes, including the immediately adjacent discharge-vessel wall, with a dielectric layer.

This object is achieved by the features of the process claim. Further advantageous features are given in the claims which depend on this claim.

Moreover, protection is claimed for a discharge lamp which has at least one electrode which is covered with a dielectric layer produced using the process according to the invention:

According to the invention, the dielectric layer, which is produced substantially from a powder or powder mixture of vitreous substances, additionally contains at least one additive, the melting temperature of which is higher than the melting temperature of the glass powder or the glass powder component with the highest melting temperature. Consequently, the fired layer comprises a vitreous main component in which the at least one additive is included in dispersed form, for example in the form of grains.

If $T_{s1}$ denotes the melting temperature of the glass powder—which is typically approximately 400 to 700° C.

—and $T_{s2}$ denotes the melting temperature of the additive, the following relationship applies: $T_{s2}>T_{s1}$. It has been found that good results can be achieved with additives whose melting temperature is at least 100° C. higher than the melting temperature of the glass powder or the glass powder component with the highest melting temperature, i.e. the following relationship applies: $T_{s2}\geqq 100°\ C.+T_{s1}$, where the values for $T_{s1}$ and $T_{s2}$ are to be given in ° C.

Suitable additives are in particular powders comprising ceramic substances and/or crystalline or amorphous metal oxides, e.g. crystalline or amorphous aluminum oxide powder with a melting temperature of more than 2000° C. and/or quartz glass powder with a melting temperature of more than 1400° C. The proportion by weight made up by the additive or additives is between approximately 2% and 30%, preferably between 5% and 20%. Below the lower limit, the positive effect of the at least one additive is no longer sufficient. Above the upper limit, cracks and similar mechanical disruptions to the layer occur to an unacceptable extent.

The process according to the invention for producing the abovementioned dielectric layer proposes that the abovementioned at least one additive be admixed with the printing paste containing the glass powder prior to the actual printing process, advantageously in fine-grained form. As has already been mentioned, the proportion by weight made up by the additive or additives is between approximately 2% and 30%, preferably between 5% and 20%. In this context, it is essential for the effect according to the invention that the at least one additive be specifically selected in such a manner that its melting temperature is higher than the firing temperature required for fusing the glass powder. Otherwise, the statements which have already been made in connection with the explanation of the dielectric layer apply in terms of suitable additives.

A recommended suitable printing process is the standard screen-printing process. To produce dielectric layers of relatively great thickness, further printing and melting operations are applied to the previous layer(s). Since in this case there is no longer any need to cover any free electrode surfaces, and consequently there are also no longer any wetting problems, these subsequent layers can also be produced from pure soldering glass powder, i.e. without additive(s).

The printing paste according to the invention, i.e. printing paste including additive(s), can also be used, in a simple, readily automatable and consequently inexpensive way, to apply dimensionally stable dielectric layers of any desired dimensions to metallic electrodes and the surrounding surface of the discharge vessel, specifically with a wetting behavior which is improved compared to previous pastes.

DESCRIPTION OF THE DRAWINGS

The invention is explained in more detail below with reference to an exemplary embodiment. In the drawings:

FIGS. 1*a*, 1*b* respectively show diagrammatic views of a plan view and a section on line AA of a first sheet 1 of a flat reflector with electrodes 2, 3. The first sheet 1 forms part of the discharge vessel of the flat reflector, which is completed by a second sheet (not shown), which is parallel to the first sheet, and a frame (not shown). First sheet 1 and second sheet are joined in a gastight manner to the frame by means of soldering glass (not shown) in such a manner that the interior of the discharge vessel is of cuboidal design.

The first sheet 1 comprises a base sheet 2 and in each case three anodes 3 and cathodes 4 which are in strip form and are made from silver solder, arranged alternately and parallel to one another on the base sheet 2. The anodes 3 are each covered with a dielectric layer 5 of lead borosilicate glass, to which aluminum oxide has been added as additive. FIG. 2 diagrammatically depicts the process for applying the dielectric layers 5 from FIGS. 1*a*, 1*b* using a flowchart. For this purpose, a printing screen is used, in which previously all the regions which are not required to form part of the desired printed image have been covered by a coating (not shown). After the screen has been placed onto the baseplate including the electrodes, the printing paste is applied to the screen. The printing paste comprises 25 g of soldering glass powder (Schott 8465/K6) and 7.5 g of screen-printing medium (Cerdec 80840), to which 5 g of aluminum oxide powder (Reynolds RC/HP-DBM) have previously been added as additive. Then, a squeegee is passed over the screen. After the screen is removed, the layer which has been applied is dried and then fired at 550° C. The dielectric coating is then finished.

Figure 1A:
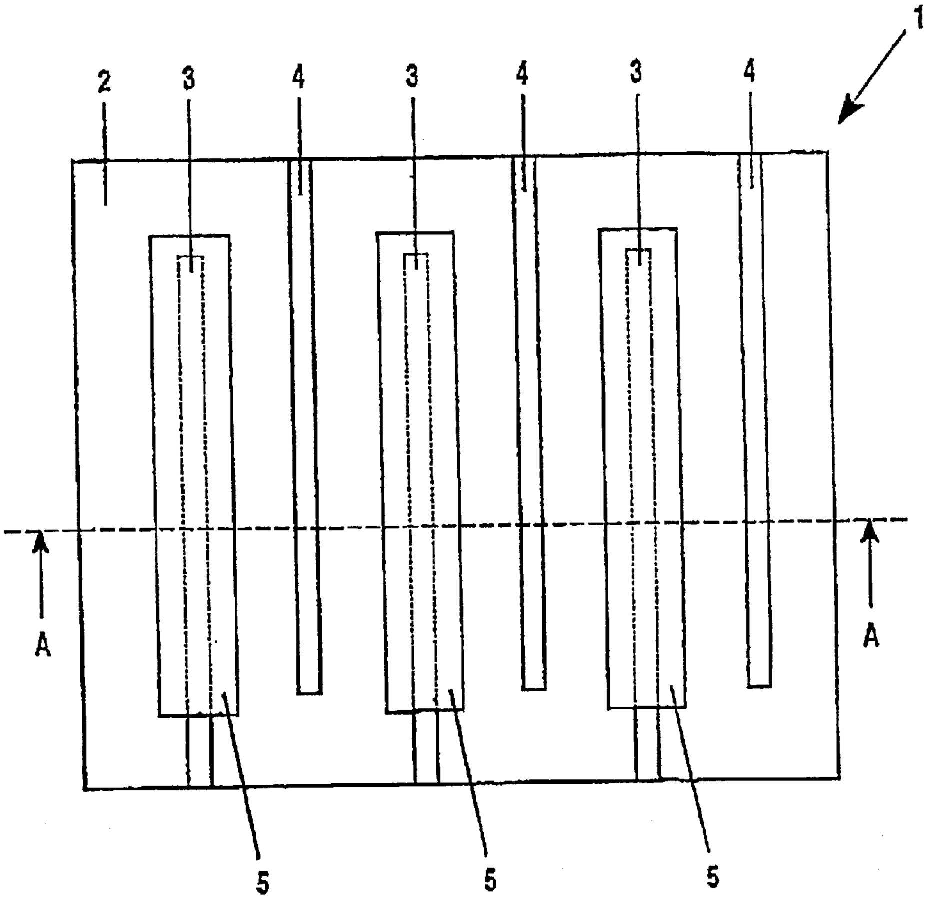
FIG. 1*a* shows a first sheet of a flat reflector with dielectric layers and electrodes in strip form.
Figure 1B:
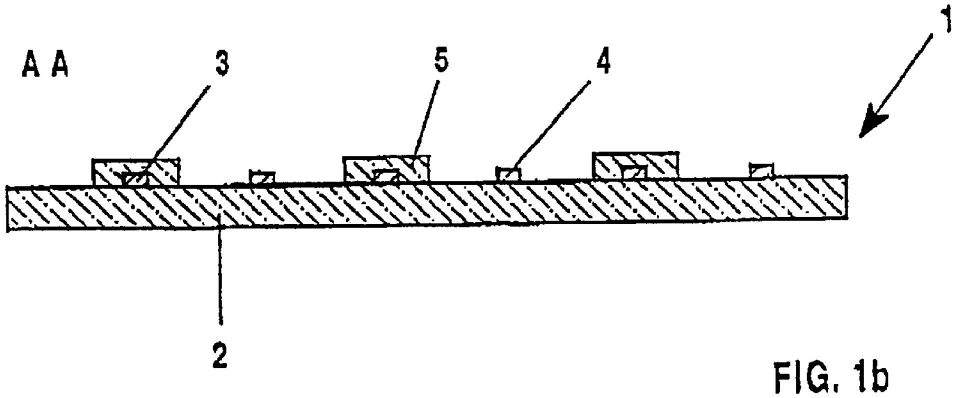
FIG. 1*b* shows a sectional view, on line AA, through the first sheet shown in FIG. 1*a,*
Figure 2:
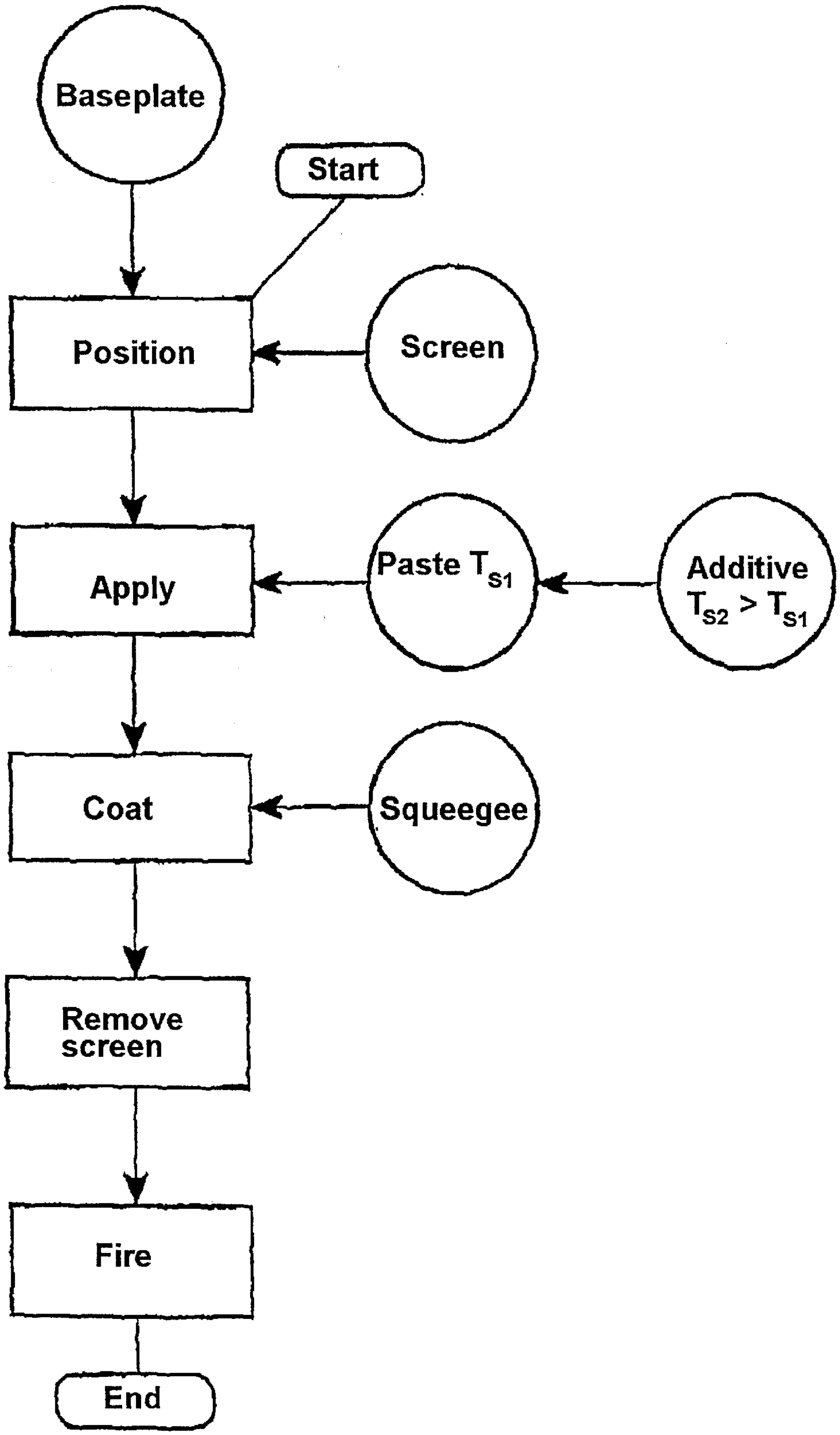
FIG. 2 shows a flowchart for the process for applying dielectric layers.

The above example is of purely exemplary nature. Naturally, the process according to the invention can also be applied to flat radiators having more or fewer than nodes and to other forms of discharge lamps, for tubular discharge lamps.

Further examples relating to the inventive application of a dielectric layer are listed in the tables below.

TABLE 1

Example 2: Application of the above screen-printing paste, drying and subsequent firing of the paste at approximately 550° C.

| Amount in g | Component | Company, designation |
|---|---|---|
| 25 | Soldering glass powder | Schott, 8465/K6 |
| 5 | $\alpha$-$Al_2O_3$ (additive) | Reynolds, RC/HP-DBM |
| 5 | 5% strength Polyox solution in $H_2O$ | Union Carbide, WSRN 3000 |
| 3 | $H_2O$ | — |

TABLE 2

Example 2: Application of the above screen-printing paste, drying and subsequent firing of the paste at approximately 600° C.

| Amount in g | Component | Company, designation |
|---|---|---|
| 25 | Soldering glass powder | Schott, 8465/K4 |
| 5 | $\gamma$-$Al_2O_3$, highly disperse (additive) | Degussa, Aluminiumoxid C |
| 5 | 5% strength Polyox solution | Union Carbide, WSRN 3000 |
| 3 | $H_2O$ | — |

TABLE 3

Example 4: Application of the above screen-printing paste, drying and subsequent firing of the paste at approximately 550° C.

| Amount in g | Component | Company, designation |
|---|---|---|
| 25 | Soldering glass powder | Schott, 8465/K6 |
| 1.32 | Quartz powder (additive) | Schott Quarzal, $d_{50}$ = 2.25 μm |
| 3 | 5% strength Polyox solution | Union Carbide, WSRN 3000 |
| 5.7 | $H_2O$ | — |

TABLE 4

Example 5: Application of the above screen-printing paste, drying and subsequent firing of the paste at approximately 600° C.

| Amount in g | Component | Company, designation |
|---|---|---|
| 25 | Soldering glass powder | Schott, 8465/K6 |
| 1.32 | γ-$Al_2O_3$ (additive) | Sumitomo, No. 1 |
| 5 | 5% strength Polyox solution | Union Carbide, WSRN 3000 |
| 6 | $H_2O$ | — |

TABLE 5

Example 6: Application of the above screen-printing paste, drying and subsequent firing of the paste at approximately 600° C.

| Amount in g | Component | Company, designation |
|---|---|---|
| 25 | Soldering glass powder | Schott, 8465/K6 |
| 1.32 | MgO (additive) | Produced by applicant |
| 5 | 5% strength Polyox solution | Union Carbide, WSRN 3000 |
| 8 | $H_2O$ | — |

TABLE 6

Example 7: Application of the above screen-printing paste, drying and subsequent firing of the paste at approximately 600° C.

| Amount in g | Component | Company, designation |
|---|---|---|
| 25 | Soldering glass powder | Schott, 8465/K6 |
| 12.5 | α-$Al_2O_3$ (additive) | Sumitomo, CAH 5000 |
| 1 | $SiO_2$ (additive) | Wacker, HDK T40 |
| 10 | 5% strength Polyox solution | Union Carbide, WSRN 3000 |
| 20 | 0.7% strength Kelzan solution | Kelco |

TABLE 7

Example 8: Application of the above screen-printing paste, drying and subsequent firing of the paste at approximately 600° C.

| Amount in g | Component | Company, designation |
|---|---|---|
| 25 | Soldering glass powder | Schott, 8465/K6 |
| 6.25 | α-$Al_2O_3$ (additive) | Sumitomo, CAH 5000 |
| 0.5 | γ-$Al_2O_3$, highly disperse (additive) | Degussa, Aluminiumoxid C |
| 5 | 5% strength Polyox solution | Union Carbide, WSRN 3000 |
| 10 | Screen-printing medium | Cerdec 80840 |

TABLE 8

Example 9: Application of the above screen-printing paste, drying and subsequent firing of the paste at approximately 600° C.

| Amount in g | Component | Company, designation |
|---|---|---|
| 25 | Soldering glass powder | Schott, 8465/K6 |
| 6.25 | α-$Al_2O_3$ (additive) | Reynolds, RC/HP-DBM |
| 0.5 | Alon C (additive) | Degussa, Aluminiumoxid C |
| 5 | 5% strength Polyox solution | Union Carbide, WSRN 3000 |
| 12 | Screen-printing medium | Cerdec 80840 |

TABLE 9

Example 10: Application of the above screen-printing paste, drying and subsequent firing of the paste at approximately 600° C.

| Amount in g | Component | Company, designation |
|---|---|---|
| 25 | Soldering glass powder | Schott, 8465/K6 |
| 8.3 | α-$Al_2O_3$ (additive) | Reynolds, RC/HP-DBM |
| 5 | Screen-printing medium | Cerdec 80840 |
| 4 | $H_2O$ | — |

What is claimed is:

1. A dielectric layer produced from a powder or powder mixture of vitreous substances, the layer additionally containing at least one additive, the melting temperature of which is higher than the melting temperature of the glass powder or of the glass powder component with the highest melting temperature, characterized in that the proportion by weight formed by the at least one additive is in the range between 5% and 20%, and the layer is suitable for a discharge lamp, which discharge lamp is suitable for operation by means of dielectric barrier discharge, the discharge lamp having the following:

a discharge vessel which at least partially comprises an electrically nonconductive material, and electrodes which are arranged on the discharge-vessel wall, the dielectric layer completely covering at least one electrode at least in a partial region, and the dielectric layer additionally covering at least the discharge-vessel wall which is immediately adjacent to this partial region of the electrode.

2. The layer as claimed in claim 1, in which the melting temperature of the additive is at least 100° C. higher than the melting temperature of the glass powder or of the glass powder component with the highest melting temperature.

3. The layer as claimed in claim 1, in which the at least one additive contains crystalline or amorphous metal oxide, in particular crystalline or amorphous aluminum oxide.

4. The layer as claimed in claim 1, in which the at least one additive contains quartz glass.

5. A discharge lamp which is suitable for operation by means of dielectric barrier discharge, having a discharge vessel which at least partially comprises an electrically nonconductive material, which discharge vessel contains a gas fill in its interior, electrodes which are arranged on the discharge-vessel wall, at least one electrode being completely covered by means of a dielectric layer at least in a partial region and the layer additionally covering at least the discharge-vessel wall which is immediately adjacent to this partial region of the electrode, characterized in that the dielectric layer has all the features of claim 1.

6. A process for producing a dielectric layer for a discharge lamp which is suitable for operation by means of dielectric barrier discharge, having a discharge vessel which at least partially comprises an electrically nonconductive material, electrodes which are arranged on the discharge-vessel wall, at least one electrode being completely covered by means of the dielectric layer at least in a partial region and the layer additionally covering at least the discharge-vessel wall which is immediately adjacent to this partial region of the electrode, for which purpose a printing paste, which printing paste contains a powder or powder mixture of vitreous substances, at least one additive is added to which printing paste before the printing paste is printed onto the electrode (s), is printed and then fused onto the electrode(s), the melting temperature of the additive being higher than the melting temperature of the glass powder or the glass powder component with the highest melting temperature, and the proportion by weight made up by the additive or, if appropriate, the sum of the proportions by weight made up by the additives lying in the range between 5% and 20%.

7. The process as claimed in claim 6, in which the melting temperature of the additive is at least 100° C. higher than the melting temperature of the glass powder or the glass powder component with the highest melting temperature.

8. The process as claimed in claim 6, in which the at least one additive contains crystalline or amorphous metal oxide, in particular crystalline or amorphous aluminum oxide.

9. The process as claimed in claim 6, in which the at least one additive contains quartz glass.

10. The process as claimed claim 6, in which the printing is carried out by means of the screen-printing technique.

* * * * *